United States Patent [19]

Adachi

[11] Patent Number: 5,045,438

[45] Date of Patent: Sep. 3, 1991

[54] PROCESS FOR PREPARING SUBSTRATE OF OPTICAL DISC

[75] Inventor: Nobuyuki Adachi, Odawara, Japan

[73] Assignee: Fuji Photo Film Co., Ltd., Kanagawa, Japan

[21] Appl. No.: 416,418

[22] Filed: Oct. 3, 1989

[30] Foreign Application Priority Data

Oct. 4, 1988 [JP] Japan ................. 63-251571

[51] Int. Cl.$^5$ .............................................. G11B 7/24
[52] U.S. Cl. .................................... 430/321; 430/296; 430/397; 430/945
[58] Field of Search ................ 430/321, 296, 945, 397

[56] References Cited

U.S. PATENT DOCUMENTS 4,410,968 10/1983 Frohbach et al. ................. 430/945
4,716,063 12/1987 Uehara et al. ...................... 430/945

Primary Examiner—Charles L. Bowers, Jr.
Assistant Examiner—Thorl Chea
Attorney, Agent, or Firm—Sixbey, Friedman, Leedom & Ferguson

[57] ABSTRACT

A process for the preparation of a substrate of an optical disc having a groove or a series of pits at a predetermined track pitch which comprises the steps of: recording a latent pattern image of the groove or the series of pits on a resist disc comprising a glass disc and a photoresist layer formed thereon, by irradiating a surface of the photoresist layer of the resist disc under rotation at a predetermined velocity with a laser beam or an electron beam emitting from a recording head; producing a stamper using the resist disc having the latent pattern image; and producing the substrate by molding a material of the substrate using the stamper as a mold, is disclosed. In the process of producing a recorded resist disc (i.e., cutting process), the recording head moves in a radial direction of the resist disc at a velocity $V_1$ which is defined by the following equation:

$$V_1 = V_O \times 1/d$$

wherein $V_O$ is a velocity to record on the photoresist the pattern image at the predetermined track pitch and "d" is a ratio of thermal dimensional variation of material of the substrate to that of material of the stamper.

7 Claims, 1 Drawing Sheet

PROCESS FOR PREPARING SUBSTRATE OF OPTICAL DISC

BACKGROUND OF THE INVENTION

1. Field of the Invention

The present invention relates to a process for preparing a substrate of an optical disc. In particular, the present invention relates to a process for a substrate of an optical disc having highly precise track pitches and formating positions.

2. Description of Prior Art

Information recording media utilizing a beam of high energy density such as a laser beam have been developed in recent years and are now put into practical use. Such recording medium is generally called "optical disc", and the practical applications thereof have been found, for example, as a video disc and an audio disc as well as a disc memory for a large-capacity computer and a large-capacity static image file. The optical disc is generally prepared utilizing a metallic stamper formed by use of a master disc in which a groove or a series of pits (a extremely small sized pattern in the form of depression) corresponding to information signals is formed in the form of a spiral or circles. In detail, the substrate of the optical disc having the above-mentioned groove or the series of pits is produced by molding a material for the substrate using the stamper as a mold, and on the substrate are optionally formed a recording layer, reflecting layer, protective layer, etc., whereby an optical disc is prepared.

The substrate of the optical disc used in writable-type optical disc has a groove (e.g., a single groove or a set of plural grooves in the form of a spiral or circles) serving as a tracking guide, and/or a series of pits. The substrate having the groove is called "replica disc". The substrate of the optical disc only for reproduction has generally a series of pits corresponding to recorded signals.

The above-mentioned master disc, which is used for preparing an optical disc, is prepared by the following processes. In the first place, a photoresist layer of a positive type is formed on an appropriate substrate such as a glass plate to form a resist disc. Then, the photoresist layer is irradiated with (i.e., exposed to) a laser beam under rotation of the resist disc at a predetermined velocity to form a latent image of a groove or a series of pits (preparation of a recorded resist disc). After the irradiation is complete, the photo-resist layer is subjected to developing treatment to remove the irradiated portion of the layer and then subjected to baking treatment for a certain period of time to cure the remaining portion of the photoresist layer. Thus, a master disc having a groove or a series of pits thereon is prepared.

The irradiation of the photoresist layer with the laser beam (which is called "laser cutting process" or "cutting procedure") is generally performed using a laser cutting machine as shown in FIG. 1. In the cutting procedure, a recording head of emitting a laser beam moves generally from an inner side to an outer side on the resist disc under rotation, for instance, at 1,800 r.p.m., whereby signals are recorded (cut) on the resit disc (e.g., recording of one field of NTSC video signal on one track) as a latent pattern image. For example, in the case that on the resist disc are spirally formed tracks of 20,000 at a track pitch of 1.6 $\mu$m within an area from a radius of 29.0 mm to that of 61.0 mm, the cutting is started simultaneously when the recording head reaches the position far from center of the resist disc at 29.0 mm, the cutting being conducted so as to control the moving velocity of the recording head to 2.88 mm/min. ($1.6 \times 10^{-3} \times 1800 = 2.88$), and the cutting is terminated when the resist disc revolves as much as 20,000 times. The resist disc on which the latent pattern image is recorded as above is developed to obtain a master disc.

The stamper is produced by processes of forming a conductive area on the surface of the master disc to change its surface into one having conductivity, electroplating a metal on the surface, separating both the elecroplated metal layer and the photoresist layer from the glass disc, and removing the photoresist layer from the elecroplated metal layer. This metal layer is used as a stamper. The surface of the obtained stamper has a reverse pattern of that of the master disc. The pattern of the stamper has the same dimension as that of the master disc except that it has the reverse pattern. The substrate of the optical disc is generally produced by molding a resin by use of an injection mold equiped with the stamper as obtained above. Thus produced substrate has a surface of the same pattern as that of the master disc.

Thus, the pattern such as a groove or a series of pits on the substrate of the optical disc should correspond to that of the master disc.

The molding of a resin (i.e., plastic) using the stamper is generally conducted at high temperatures (about 100° C. in an area of contact between the stamper and the molten resin) for obtaining a substrate of an optical disc. The molded resin inherently shrinks in the course that it is cooled to an ambient temperature. The stamper made of metal such as Ni also shrinks in the same course. A coefficient of linear expansion of the plastic is generally larger than that of the metal. Accordingly, the diameter of the molded substrate is made smaller than that of the stamper, and the pattern of the groove or the series of pits which are spirally or concentrically formed on the substrate of the optical disc is also smaller in diameter than that of the stamper.

Thus, the inner diameter, the outer diameter and the pattern such as the groove of the stamper are not accurately copied to the substrate of the optical disc. Therefore, it is observed that erroneous operation at the start of reproduction occurs due to ill location of the startig position for reproduction in the inner side (starting position of tracking) and tracking error occurrs owing to inaccurate pattern such as inaccurate groove position. Further, erroneous operation is observed at the time of start of recording, the starting position for recording is same as that of the reproduction and tracking error in recording procedure occurs in the same manner as in the above reproduction.

In order to avoid such troubles, a substrate of an optical disc is generally molded using a stamper which has a pattern whose starting site is located at a position outer than the predetermined position. In consideration of both the coefficient of linear expansion of the resin of the substrate and that of the metal of the stamper. The starting position of reproduction (recording) in the inner side is formed at the predetermined position on the resulting substrate, so that occurrence of erroneous operation at the start of reproduction decreases extremely. However, tracking error and read error in reproducing or recording procedure are not satisfactorily prevented.

SUMMARY OF THE INVENTION

It is an object of the present invention to provide a process for the preparation of a substrate of an optical disc having highly accurate track pitches and formating positions.

It is another object of the invention to provide a process for the preparation of a substrate of an optical disc which can be utilized for the preparation of an optical disc reduced in tracking error and read error.

It is a further object of the invention to provide a process for the preparation of a substrate of an optical disc which can be utilized for the preparation of an optical disc being capable of recording or reproducing by means of any recording or reproducing machine with reduced tracking error and read error.

There is provided by the present invention a process for the preparation of a substrate of an optical disc having thereon a groove or a series of pits at a predetermined track pitch which comprises the steps of:

recording a latent pattern image of the groove or the series of pits on a resist disc comprising a glass disc and a photoresist layer formed thereon, by irradiating a surface of the photoresist layer of the resist disc under rotation at a predetermined velocity with a laser beam or an electron beam emitting from a recording head which moves in a radial direction of said resist disc at a velocity $V_1$ which is defined by the following equation:

$$V_1 = V_0 \times 1/d$$

wherein $V_0$ is a velocity to record on the photoresist the pattern image at the predetermined track pitch and "d" is a ratio of thermal dimensional variation of material of the substrate to that of material of a stamper mentioned below;

producing a master disc having the recorded pattern image by developing the latent pattern image recorded on the resist disc;

producing a stamper by forming a metal layer on the pattern image of the master disc through electroplating and removing the master disc from the electroplated metal layer; and producing the substrate having a reverse pattern of the stamper thereon by molding a material of the substrate using the stamper as a mold.

The present invention is a simple and inexpensive process for the preparation of a substrate of an optical disc which has extremely accurate track pitches and prominently accurate formating positions. Further, the substrate of the optical disc obtained by the process according to the present invention exhibits reduced tracking error and read error in reproducing or recording procedure. Furthermore, the above optical disc is capable of recording or reproducing by means of any recording or reproducing machine, with almost negligible tracking error and read error.

DETAILED DESCRIPTION OF THE INVENTION

Figure 1:
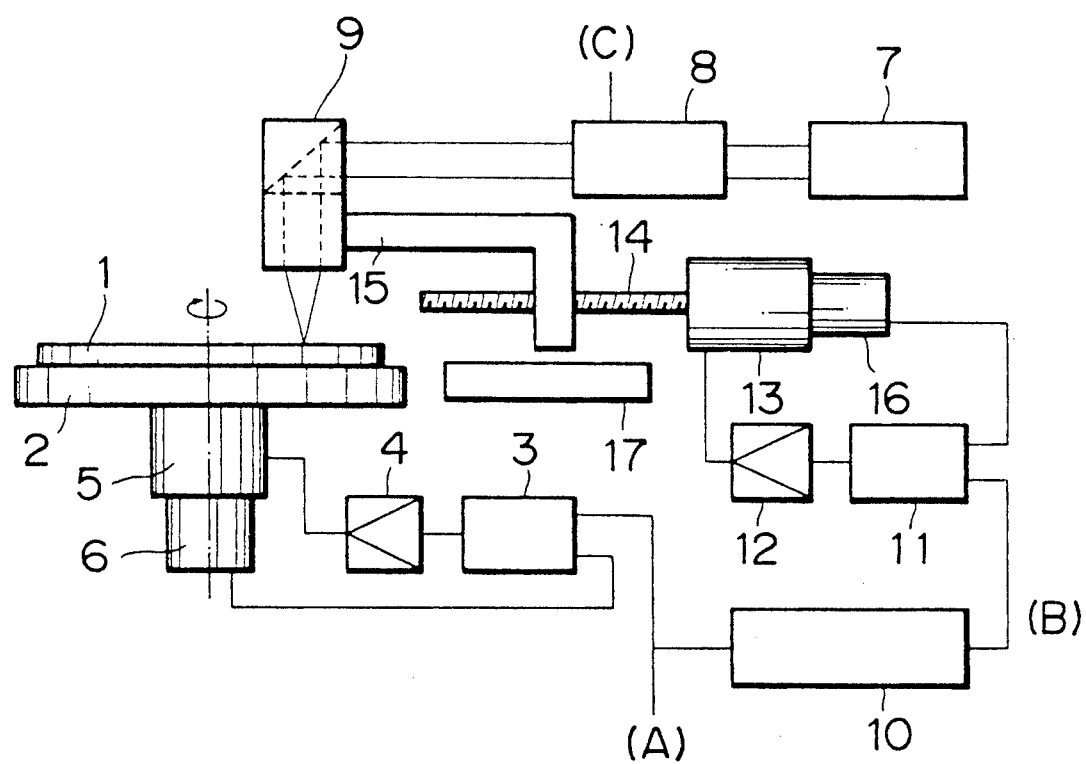
FIG. 1 is a view showing an example of a cutting process in the invention.

The present invention contains the steps of:

recording a latent pattern image by irradiating a surface of a photoresist layer formed on a glass disc (resist disc) with a laser beam or an electron beam emitting from a recording head to produce a recorded resist disc (cutting process); producing a master disc by developing the latent pattern image recorded the resist plate; producing a stamper by forming a metal layer on the pattern image on the master disc through electroplating and removing the master disc from the electroplated metal layer; and producing a substrate of an optical disc by molding a material of the substrate using the stamper as a mold. The present invention has a characteristic feature in the cutting process in which the recorded resist disc is produced.

FIG. 1 is a view showing an example of the cutting process in the invention.

In FIG. 1, the resist disc 1 is fixed on a turntable 2 which rotates by means of a spindle motor 5. The spindle motor is controlled in its rotation through both a PLL (Phase Locked Loop) servo controller 3 and a motor driver 4 by synchronizing signals of rotation (A) corresponding to a fundamental period generated from a recording signal generator (not illustrated). Signals of number of revolution of the spindle motor 5 are fed back by a PLL servo controller 3 through a encoder 6, whereby the revolution (number of revolution) of the turntable 2 is precisely controlled. A laser beam generated from a laser source 7 is modulated by a recording signal (C) generated from the recording signal generator in a modulater 8. The modulated laser beam, which is emitted by a recording head 9 arranged over the resist disc 1, is irradiated on the resist disc 1. The synchronizing signals of rotation (A) are entered partly in a PLL synthesizer 10, in which the signals are converted into signal of feed rate (B) to be entered in a PLL sevo controller 11 and a motor driver 12. By the motor driver 12 is controlled the revolution of a feed motor 13. A feed unit 15 is arranged in such manner that its one end is screwed with a feed screw 14 of rotation corresponding to a rotation of the feed motor and another end is fixed to the recording head 9. The recording head 9 is designed to move in association with the revolution of feed motor 13, over the resist disc 1 in a radial direction of the resist disc and in relation to its movement. The signals of the revolution of the feed motor 13 are fed back by the PLL servo controller 11 through the encoder 16, whereby its revolution is precisely controlled. Movement of the recording head 9 is measured with a length measuring machine 17.

In the present invention, the resist disc is rotated at the number of revolution determined by use of the synchronizing signals of rotation (A) corresponding to a fundamental period generated from the recording signal generator. Further, the cutting (irradiation of a laser beam) is conducted by moving the recording head at a moving velocity ($V_1$) which is varied to some extent from a moving velocity ($V_0$) of the recording head calculated from a predetermined track pitch.

For example, the variation of the moving velocity ($V_1$) is carried out in the following manner.

In the first place, the cutting is provisionally conducted on a resist disc 1 comprising a glass disc and a photoresist layer thereon, at the moving velocity ($V_0$) of the recording head calculated from the predetermined track pitch to form a recorded resist disc having a latent pattern image of signals. The latent pattern image on recorded resist plate is developed to obtain a master disc. After electroplating a metal on the master disc, a stamper is produced by separating both the electroplated metal layer and the photoresist layer from the glass disc, and removing the photoresist layer from the separated part. Subsequently, utilizing the stamper as a mold, the substrate of the optical disc is prepared by molding a predetermined molding material under a predetermined condition of molding. The obtained substrate of the optical disc is cooled to an ambient temperature, and the radius ($r_1$) of the most outer track on the substrate is measured. Similarly the radius ($r_0$) of the most outer track on the stamper is measured. A ratio of the outer radius ($r_1$) of the substrate to the outer radius ($r_0$) of the stamper, that is a rate ($d = r_1/r_0$) of thermal dimensional variation of the material of the substrate to that of the material of the stamper, is then calculated.

Alternatively, the rate (d) of thermal dimensional variation of the material of the substrate to that of the material of the stamper may be determined in the following manner. After the coefficient (Es) of linear expansion of the material of the stamper and the coefficient (Ed) of linear expansion of the material of the substrate are determined from known data or by actual measurement, the ratio (Ed/Es) of coefficient (Ed) of linear expansion of material of the substrate to coefficient (Es) of linear expansion of material of the stamper, that is, (d) of thermal dimensional variation of the material of the substrate to that of the materil of the stamper, is calculated.

The signal of feed rate (b) changed from a part of the synchronizing signal of rotation in the PLL synthesizer 10 corresponds to the moving velocity ($V_0$) of the recording head determined from the predetermined track pitch. The signal of feed rate (b) is changed to the signal corresponding to the above-mentioned moving velocity ($V_1$) of the recording head 9 in the present invention. The extent of the above change is in such an range that the values of ($V_1$) and ($V_0$) satisfy the following equation:

$$V_1 = V_0 \times (1/d)$$

In other words, the moving velocity ($V_1$) of the recording head is set to the value that is changed from the moving velocity ($V_0$) thereof calculated from the predetermined track pitch by an inverse number (1/d) of a rate (d) of thermal dimensional variation of the substrate to that of the stamper.

By the above change of the moving velocity of the recording head, the width of the track pitch and the radius of the formating area are both changed by the inverse number of the above rate (d) of dimensional change. The stamper prepared through the processes as described previously using the above recorded resist disc has the same width of the track pitch and the same radius of the formatting area as those of the recorded resist disc. The substrate of the optical disc is prepared using the stamper produced in such manner as mentioned above and the material for the substrate used on determination of the rate (d) of dimensional change, under the molding condition on the determination of the rate. The obtained substrate has the width of the track pitch and the radius of the formating area accurately corresponding to the synchronizing signal of rotation from the recording signal generator.

Materials of the glass disc, the photoresist, the stamper, the substrate, etc., in the present invention can be optionally selected from those used for known processes for preparation of the substrate of the optical disc. Further, devices and methods used in the processes of the invention can be also optionally selected from those used for known processes for preparation of the substrate of the optical disc except for the change of the moving velocity of the recording head. The change of the moving velocity of the recording head can be also conducted merely by changing the signals of the feed rate in the PLL servo controller 11, so that it is not needed to improve the recording signal generator or the cutting machine. Thus, the method of the invention can be much easily carried out.

In the cutting process according to the present invention, the recording of the signals may be conducted in either spiral form or concentric form. Further, the resist disc may be rotated at either a predetermined liner velocity or a predetermined angular velocity. Furthermore, although the example of the method of moving the recording head 5 with fixing the position of the spindle motor 5 is shown in the FIG. 1, the method of moving the position of the spindle motor 5 in the right and left direction of the FIG. 1 with fixing the position of the recording head may be adopted. Both methods are essentially the same from the viewpoint that the resist disc 1 and the recording head 9 move in relation to the radial direction of the resist disc 1.

Further, in a case that the recording head 9 moves from the inner side of the resist disc 1 to the outer side thereof, the more accurate substrate of the optical disc can be obtained in such a manner that the irradiation is started at a position far from center of the resist disc at a distance $l_1$ which is difined by the following equation:

$$l_1 = l_0 \times 1/d$$

wherein $l_0$ is a distance from the center of the resist disc to an irradiation starting position which is set for recording on the photoresist the pattern image at the predetermined track pitch by moving the recording head at a velocity of $V_0$ and "d" is the ratio of thermal dimentional variation of material of the substrate to that of material of the stamper.

Similarly, in a case that the recording head 9 moves from the outer side of the resist disc 1 to the inner side thereof, the more accurate substrate of the optical disc can be obtained in such a manner that the irradiation is started at a position far from center of the resist disc at a distance $l_1$ which is defined by the above equation.

Furthermore, in the invention, the recording signal may be provided on the surface of the resist disc by irradiation of an elecron beam in the place of the laser beam.

An example of the present invention is given below.

EXAMPLE

The present example shows an example of preparing a substrate of an optical disc which uses polycarbonate and has a formating area within an area from a radius of 29.0 mm to that of 61.0 mm on its surface.

Provisionally, a solution for forming a photoresist layer (AZ1350 of Farbwerke Hoechst A. G.) was coated over a disc-shaped glass plate by means of spin coating at 300 r.p.m. to give a coated layer of the solution, and the coated layer was dried to form a photoresist layer having dry thickness of 0.15 μm on the glass plate. Using a laser cutting machine as shown in FIG. 1, the cutting was conducted by moving a recording head emitting a laser beam from an inner side to an outer side on the obtained resist disc under rotation at 1800 r.p.m., whereby the recording signals were recorded (cut) on the resist disc (e.g., recording of one field of NTSC video signal on one track).

The cutting was started simultaneously when the recording head reached the position of radius of 29.0 mm on the resist disc, the cutting being conducted so as to control the moving velocity of the recording head to 2.88 mm/min. ($1.6 \times 10^{-3} \times 1800 = 2.88$), and the cutting was terminated at the same time after 20,000 times revolution of the resist disc.

The resist disc in which the signals were recorded as above was developed to obtain a master disc. On the surace of the master disc was formed a conductive area, on which Ni was electroplated to form an elecroplated metal layer having thickness of 300 μm. Then, both the elecroplated metal layer and the photoresist layer from the glass disc were separated, and the photoresist layer was removed from the elecroplated metal layer. This metal layer was used as a stamper.

The substrate of the optical disc was prepared by molding process using the injection mold equiped with the above stamper as a mold under the following molding conditions.

Condition of Injection Molding

Temperature within heating cylinder: 320° C.
Rotation of screw: 100 r.p.m.
Injection pressure: 600 kg/cm²
Injection time: 1 second
Temperature of mold: 100° C.
Cooling time: 10 second The substrate and the stamper obtained above were cooled to 25° C., and the radii of their most outer tracks were measured. Then, a rate (d) of dimensional variation of the material of the substrate to that of the material of the stamper was calculated. It gave values of d=0.995, and 1/d=1.005.

Subsequently, a substrate of an optical disc according to the present invention was prepared by the same process as mentioned above except for altering the cutting process into the following one using the value of 1/d obtained above.

Using the laser cutting machine as shown in FIG. 1, the cutting was conducted by moving a recording head of emitting a laser beam from an inner side to an outer side on the resist disc under rotation at 1800 r.p.m., whereby the recording signals were recorded (cut) on the resist disc (e.g., recording of one field of NTSC video signal on one track).

The cutting was started simultaneously when the recording head reached the position of radius of 29.145 mm ($29.0 \times 1.005 = 29.145$) on the resist disc, the cutting being conducted so as to control the moving velocity of the recording head to 2.8944 mm/min. ($1.6 \times 10^{-3} \times 1.005 \times 1800 = 2.8944$), and the cutting was terminated at the same time after 20,000 times revolution of the resist disc.

The formating area of the obtained stamper was within the range from the inner radius of 29.145 mm to the outer radius of 61.305 mm. The formating area of the obtained substrate was within the range from the inner radius of 29.0 mm to the outer radius of 61.0 mm. Thus, the dimension of the obtained substrate was accurate as fitting for a expected purpose.

I claim:

1. A process for the preparation of a substrate of an optical disc having thereon a groove or a series of pits at a predetermined track pitch which comprises the steps of:

recording a latent pattern image of the groove or the series of pits on a resist disc comprising a glass disc and a photoresist layer formed thereon, by irradiating a surface of the photoresist layer of the resist disc under rotation at a predetermined velocity with a laser beam or an electron beam emitting from a recording head which moves in a radial direction of said resist disc at a velocity $V_1$ which is defined by the following equation:

$$V_1 = V_0 \times 1/d$$

wherein $V_0$ is a velocity to record on the photoresist the pattern image at the predetermined track pitch and "d" is a ratio of thermal dimensional variation of material of the substrate to that of material of a stamper mentioned below;

producing a master disc having the recorded pattern image by developing the latent pattern image recorded on the resist disc;

producing a stamper by forming a metal layer on the pattern image of the master disc through electroplating and removing the master disc from the electroplated metal layer; and producing the substrate having a reverse pattern of the stamper thereon by molding a material of the substrate using the stamper as a mold.

2. The process as claimed in claim 1, wherein said ratio of thermal dimensional variation is determined by provisionally performing all steps involved in the process for the preparation of a substrate of an optical disc employing a recording head which moves in a radial direction of said resist disc at a velocity $V_0$, measuring a length of a certain portion of the produced stamper and a length of the corresponding portion of the reverse pattern of the stamper produced on the substrate, and dividing the latter length by the former length.

3. The process as claimed in claim 1, wherein said ratio of thermal dimensional variation is determined by dividing a coefficient of linear expansion of the material of the substrate by a coefficient of linear expansion of the material of the stamper.

4. The process as claimed in claim 1, wherein said beam emitting from said recording head is the laser beam.

5. The process as claimed in claim 1, wherein said predetermined tracking pitch is in the range of 1.2 μm to 2.0 μm.

6. The process as claimed in claim 1, wherein said recording head moves from the inner side of the resist disc to the outer side thereof and the irradiation is started at a position far from center of the resist disc at a distance $l_1$ which is difined by the following equation:

$$l_1 = l_0 \times 1/d$$

wherein $l_0$ is a distance from the center of the resist disc to an irradiation starting position which is set for recording on the photoresist the pattern image at the predetermined track pitch by moving the recording head at a velocity of $V_0$ and "d" is the same value as defined in claim 1.

7. The process as claimed in claim 1, wherein said recording head moves from the outer side of the resist disc to the inner side thereof and the irradiation is started at a position far from center of the resist disc at a distance $l_1$ which is difined by the following equation:

$$l_1 = l_0 \times 1/d$$

wherein $l_0$ is a distance from the center of the resist disc to an irradiation starting position which is set for recording on the photoresist the pattern image at the predetermined track pitch by moving the recording head at a velocity of $V_0$ and "d" is the same value as defined in claim 1.

* * * * *